June 17, 1952 G. F. DE LA MATER 2,600,857
DRILL HOLE LOCATING APPARATUS
Filed Dec. 2, 1949
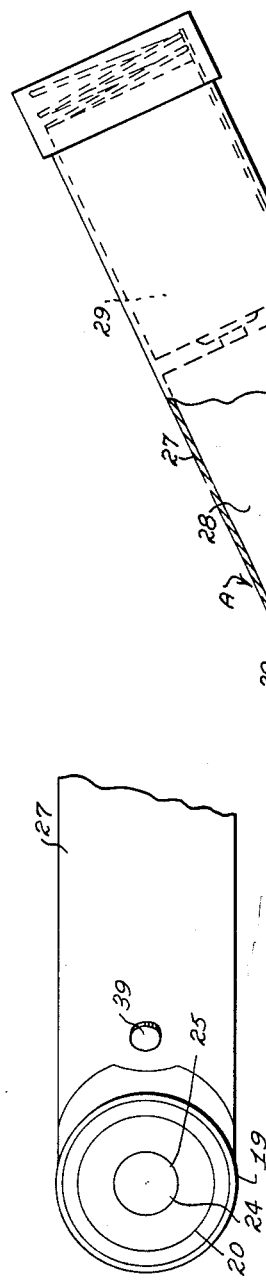
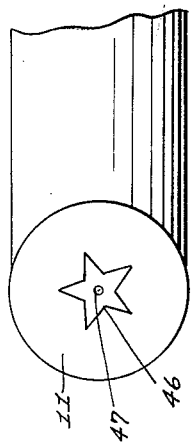
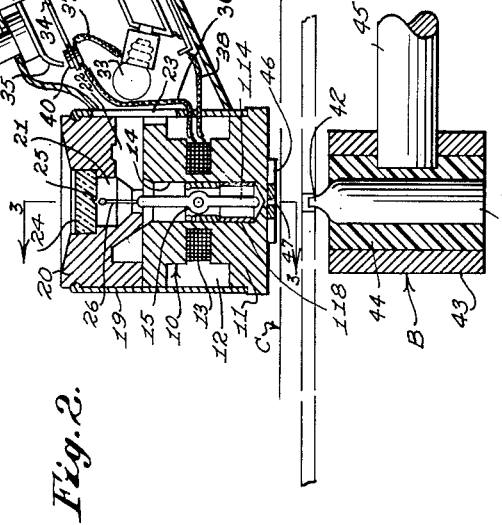
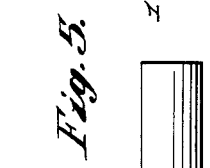
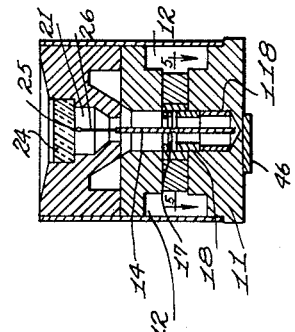
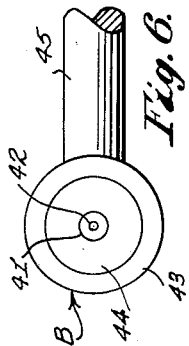
INVENTOR
GAYLE F. DE LA MATER
BY McMorrow, Berman & Davidson
ATTORNEYS Patented June 17, 1952

2,600,857

UNITED STATES PATENT OFFICE 2,600,857

DRILL HOLE LOCATING APPARATUS

Gayle F. De La Mater, San Diego, Calif.

Application December 2, 1949, Serial No. 130,825

6 Claims. (Cl. 175—183)

This invention relates to drill hole locating apparatus and more particularly to apparatus for locating on one side of a sheet metal structure a drill hole having a known location on the opposite side of such structure.

It is among the objects of the invention to provide an improved drill hole locating apparatus which can be conveniently held in the hand of an operator to locate the positions of drill holes on one side of a structure of opaque material from selected or predetermined locations on the opposite side of such structure, which is effective to accurately locate the positions of the drill holes and distinctly mark such positions, which is self illuminated so that it can be used in poor light, and which is extremely accurate in operation, simple and durable in construction, economical to manufacture, and easy to use.

Other objects and advantages will become apparent from a consideration of the following description and the appended claims in conjunction with the accompanying drawing wherein:

Figure 1 is a longitudinal cross sectional view of the apparatus in operative position at the opposite sides of a diagrammatically illustrated sheet metal structure;

Figure 2 is a top plan view of a fragmentary portion of the apparatus illustrated in Figure 1;

Figure 3 is a cross section on the line 3—3 of Figure 1;

Figure 4 is a bottom plan view of a fragmentary portion of the apparatus illustrated in Figure 1;

Figure 5 is a transverse cross section on a somewhat enlarged scale on the line 5—5 of Figure 3; and Figure 6 is a top plan view of another fragmentary portion of the apparatus illustrated in Figure 1.

With continued reference to the drawing, the apparatus comprises two units A and B, which are disposed at respectively opposite sides of a sheet metal structure, such as the diagrammatically illustrated structure C, for locating on one side of such structure the positions of drill holes the locations of which are either known or selected on the opposite side of such structure.

In the manufacture of structures, such as air frames formed of components of sheet aluminum, the rivet holes are normally drilled from the inner side of such a structure. It frequently happens, however, that, because of the formation of the inner side of the structure, it is impossible to drill some of the holes at the proper locations from the inside of the structure because of interference of components of the structure with the drill. In these cases it becomes necessary to drill the holes from the outside of the structure and in such cases the location of the drill holes on the outside of the structure must be accurately determined with reference to the inner side of the structure.

In locating the positions of such drill holes on the outer side of the structure the unit A is used outside of the structure and the unit B is used inside.

The unit A comprises an electro-magnet generally indicated at 10 including a substantially cylindrical core member 11 of magnetic material, such as iron, having an annular groove or recess 12 therearound substantially symmetrical with the mid-length location of the core. This groove includes an outer portion and a radially and inwardly directed extension narrower than the outer portion, and a high resistance magnetic coil 13 is mounted in the narrower inner portion of the groove in the core. The core is provided with a cylindrical bore 14 which opens to one end of the core and extends substantially to the opposite end but is closed at its end adjacent such opposite end of the core. This bore is substantially coaxial with a longitudinal center line of the core and with the magnetic coil 13.

A needle 114 of thin magnetic material, such as shim steel, is disposed in the bore 14 and extends longitudinally thereof. This needle is provided at its mid-length location with an eye 15 and a bearing jewel 16 is secured in this eye. A piece of fine, stiff wire is bent to form a D-shaped staff 17 the ends of which are pointed and engage the opposite side of the jewel 16 to provide a jewel bearing for the needle. This staff is mounted in a sleeve 18 disposed in the bore 14 and held in proper position longitudinally of the bore by a spacer sleeve 118 one end of which engages the closed end of the bore and the other end of which provides a bearing for the adjacent end of the bearing mounted in the sleeve 18.

A cylindrical housing 19 surrounds the core 11 of the electro-magnet and extends beyond the end of the core to which the bore 14 opens, and a circular block 20 of nonmagnetic material such as aluminum, is mounted on this end of the core and is held thereon by the housing 19. This block has its end opposite the core 11 concavely shaped and is provided with a centrally located bore 21 which extends therethrough substantially in alignment with the bore 14 in the magnet core 11 and has a radially disposed recess 22 which is provided in the end of the block 20 adjacent the core 11 and extends from the bore 21 to the exterior of the block. The housing 19 is provided with an aperture 23 registering with the outer end of this recess 22. A crystal 24 in the shape of a circular disc, is mounted in the end of the bore 21 in the block 20 remote from the magnet core and an indentation or dot 25 is provided on the under or inner surface of this crystal at the center thereof and constitutes an indicating mark for the instrument. A slender pointer 26 is attached to the needle and extends from the needle to a location closely adjacent the under or inner surface of the crystal and this pointer has on its end adjacent the crystal a colored head which cooperates with the indicating dot 25 to indicate the position of the needle relative to the bore 14 in which the needle is pivotally supported.

A battery case 27 is secured at one end of the housing 19 in position to inclose the aperture 23 in the housing and flash light battery cells 28 and 29 are contained in this case.

A flanged disc 30 is secured transversely in the battery case adjacent the housing 19 and a bracket 31 secured at one end to this disc extends toward the aperture 23 in the housing. A bulb socket 32 is mounted on the end of bracket 31 adjacent the housing 19 and a light bulb 33 carried by this socket is positioned to transmit light through the recess 22 into the bore 21 to illuminate the pointer 26 and indicating dot 25.

A switch is carried by the flanged disc 30 and comprises a first resilient switch arm 34 extending from the disc toward the housing 19 and a second resilient arm 35 also extending from the disc 30 toward the housing 19 in spaced relationship to the arm 34. Conductors 36 and 37 connect the insulated terminal 40 carried by switch arm 34 to the coil 13 and bulb socket 32 respectively. The socket is grounded through the bracket 31 and the coil is grounded through the conductor 38. The battery including the cells 28 and 29 is grounded at one end to the battery case and is in contact at its opposite end with one end of the switch arm 35 which switch arm is electrically insulated from the supporting disc 30. The arm 35 is bent at its opposite end toward the contact 40 carried by switch arm 34 and a thumb button 39 mounted on switch arm 35 is operative when manually depressed, to bring the bent end of arm 35 into engagement with contact 40 thus establishing parallel energizing circuits for the bulb 33 and coil 13.

The coil 13 is a high resistance coil, a resistance of approximately 80 ohms having been found to provide satisfactory results in use, and bulb 33 is an ordinary flash light bulb, so the flash light battery cells 28 and 29 will last for a satisfactory period of use.

When the coil 13 is energized it establishes a magnetic field which symmetrically permeates the core 11 and is centered along the longitudinal center line of the bore 14. This magnetic field temporarily magnetizes the needle and prevents any reversal of polarity of the needle while, at the same time, urging the needle to a position in which it is substantialy in alignment with the longitudinal center line of the bore. This position of the needle is indicated by a substantial coincidence of the head of the pointer 26 with the indicating dot 25 and any deflection of the needle from this position is indicated by a departure of the pointer head from the indicating dot.

The unit B comprises an elongated permanent magnet 41 which may be of cylindrical form and has one end reduced to provide a nose 42. The polarity at the nose 42 is opposite to the polarity of the end of the needle adjacent the closed end of the bore 14.

This magnet is mounted in a cylindrical housing 43 considerably larger than the magnet and is held in centered relationship in the housing by a bushing 44 of electrically insulative, nonmagnetic material which surrounds the magnet within the housing. A handle 45, which may be of elongated cylindrical form, is secured at one end to the housing 43 and projects radially therefrom.

In using the apparatus the magnet 41 is positioned at the inner side of the structure C with its nose 42 at the desired location of the drill hole. The unit A is then placed against the outer side of the structure with the electromagnet 11 at the estimated location of the hole on the outer side of the structure. The switch is then closed by depressing the thumb button 39 and, if the electromagnet is not properly located the needle 114 will be deflected by the magnet 41 from its normal or neutral position substantially in alignment with the longitudinal center line of the bore 14, the direction in which the adjacent end of the needle is displaced from the nose of the permanent magnet 41 being indicated by the direction in which the head of the pointer 26 is displaced from the indicating dot 25. The electromagnet is then moved over the outer surface of the structure until the head of the pointer coincides with the location of the indicating dot. The needle 114 will then be in alignment with the longitudinal center line of the permanent magnet 41 and with the longitudinal center line of the bore 14 and the end of the needle adjacent the structure C will be directly over the drill hole location.

A flat pad 46 of absorbent material is secured to the end of the electromagnetic core 11 opposite the block 20 and a small aperture 47 in this pad is centered on the longitudinal center line of the bore 14.

The pad is impregnated with a suitable ink or other marking material and when the location of the drill hole has been determined, as explained above, the pad 46 is pressed firmly against the adjacent surface of the structure to make a mark thereon. The aperture 47 will provide in this mark a small dot indicating the location of the drill hole center.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

I claim:

1. Drill hole locating apparatus comprising an electro-magnet having a bore therein, a needle disposed in said bore and pivotally supported substantially at its mid length location in the magnetic field of said electro-magnet, a crystal supported at a location spaced from one end of the bore in said electro-magnet and having an indicating dot thereon, a pointer extending from said needle substantially to the adjacent surface of said crystal and cooperating with said dot to indicate the position of said needle relative to said bore, a battery case secured to said electromagnet, a lamp bulb carried by said battery case for illuminating said crystal and said pointer, a battery in said case, and conductor means providing an energizing circuit from said battery to said electro-magnet and said lamp bulb.

2. Drill hole locating apparatus comprising an electro-magnet having a longitudinally extending bore therein, a needle pivotally mounted in said bore to extend longitudinally thereof and urged by the magnetic field of said electro-magnet to a position in which it is substantially in alignment with the longitudinal center line of said bore, means indicating deflection of said needle from said position, a battery case secured to said electro-magnet, a battery in said battery case, and means providing an energizing circuit from said battery to said electro-magnet.

3. Drill hole locating apparatus comprising an electro-magnet having a bore therein, a needle disposed in said bore and pivotally supported substantially at its mid-length location in the magnetic field of said electro-magnet, a crystal supported at a location spaced from one end of the bore in said electro-magnet and having an indicating dot thereon, a pointer extending from said needle substantially to the adjacent surface of said crystal and cooperating with said dot to indicate the position of said needle relative to said bore, a battery case secured to said electro-magnet, a lamp bulb carried by said battery case for illuminating said crystal and said pointer, a battery in said case, conductor means providing an energizing circuit from said battery to said electro-magnet and said lamp bulb, and marking means carried by the electro-magnet and engageable on the surface of the structure to physically indicate on the surface the point of alignment of the needle with the permanent magnet.

4. In an apparatus for locating through an opaque structure a permanent magnet on one side thereof, an electro-magnet having a bore therein, a needle pivotally housed in said bore for swinging movement transversely of the bore, a crystal supported in alignment with said bore and disposed transversely of the needle, said crystal having an indication mark formed thereon, a pointer extending from one end of the needle and arranged at right angles to the pivot axis of the needle, said pointer terminating adjacent to the crystal and cooperating with the indication mark to indicate the aligned position of the needle relative to the cooperative magnet on the opposite side of the structure, a housing affixed to the electro-magnet, illuminating means in said housing for illuminating the needle and crystal, and a source of electrical energy in said housing for the illuminating means and the electro-magnet.

5. In an apparatus for locating through an opaque structure a permanent magnet on one side thereof, an electro-magnet having a bore therein, a needle pivotally housed in said bore for swinging movement transversely of the bore, a crystal supported in alignment with said bore and disposed transversely of the needle, said crystal having an indication mark formed thereon, a pointer extending from one end of the needle and arranged at right angles to the pivot axis of the needle, said pointer terminating adjacent to the crystal and cooperating with the indication mark to indicate the aligned position of the needle relative to the cooperative magnet on the opposite side of the structure, a housing affixed to the electro-magnet, illuminating means in said housing for illuminating the needle and crystal, a source of electrical energy in said housing for the illuminating means and the electro-magnet, and marking means carried by the electro-magnet at the end thereof opposite to the crystal, said marking means being engageable on the surface of the structure to physically indicate on the surface the point at which the needle is directed.

6. In an apparatus for locating through an opaque structure a permanent magnet on one side thereof, an electro-magnet having a bore therein, a needle pivotally housed in said bore for swinging movement transversely of the bore, a crystal supported in alignment with said bore and disposed transversely of the needle, said crystal having an indication mark formed thereon, a pointer extending from one end of the needle and arranged at right angles to the pivot axis of the needle, said pointer terminating adjacent to the crystal and cooperating with the indication mark to indicate the aligned position of the needle relative to the cooperative magnet on the opposite side of the structure, a housing affixed to the electro-magnet, illuminating means in said housing for illuminating the needle and crystal, a source of electrical energy in said housing for the illuminating means and the electro-magnet, and marking means carried by the electro-magnet at the end thereof opposite to the crystal, said marking means being engageable on the surface of the structure to physically indicate on the surface the point at which the needle is directed, said marking means including an inking pad having an opening therein alignable with the needle when the pointer on the needle is in coincidence with the indication mark.

GALE F. DE LA MATER.

REFERENCES CITED

The following references are of record in the file of this patent:

UNITED STATES PATENTS

| Number | Name | Date |
| --- | --- | --- |
| 1,940,521 | Acosta | Dec. 19, 1933 |
| 1,971,189 | Leibing | Aug. 21, 1934 |
| 2,346,773 | McBride et al. | Apr. 18, 1944 |

FOREIGN PATENTS

| Number | Country | Date |
| --- | --- | --- |
| 681,671 | France | Feb. 3, 1930 |